(12) United States Patent
Hamad et al.

(10) Patent No.: US 11,485,116 B2
(45) Date of Patent: Nov. 1, 2022

(54) COLLAPSED BUBBLE DRAWTAPE FILM FOR IMPROVED ELASTIC AND STIFFNESS PERFORMANCE IN TRASH BAGS

(71) Applicant: Dow Global Technologies LLC, Midland, MI (US)

(72) Inventors: Fawzi G. Hamad, Freeport, TX (US); Mustafa Bilgen, Freeport, TX (US); Jose Eduardo Ruiz, Freeport, TX (US); Jon W. Hobson, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 225 days.

(21) Appl. No.: 16/954,269

(22) PCT Filed: Dec. 5, 2018

(86) PCT No.: PCT/US2018/063972
§ 371 (c)(1),
(2) Date: Jun. 16, 2020

(87) PCT Pub. No.: WO2019/133203
PCT Pub. Date: Jul. 4, 2019

(65) Prior Publication Data
US 2021/0086484 A1    Mar. 25, 2021

Related U.S. Application Data

(60) Provisional application No. 62/610,670, filed on Dec. 27, 2017.

(51) Int. Cl.
*B32B 27/08* (2006.01)
*B32B 7/027* (2019.01)
(Continued)

(52) U.S. Cl.
CPC .............. *B32B 27/08* (2013.01); *B32B 7/027* (2019.01); *B32B 27/32* (2013.01); *B65D 33/28* (2013.01);
(Continued)

(58) Field of Classification Search
CPC . B32B 27/08; B32B 2435/02; B32B 2307/72; B32B 2307/30; B32B 2250/40; B32B 2250/242; B32B 27/32; B32B 7/027
See application file for complete search history.

(56) References Cited

U.S. PATENT DOCUMENTS

| 2,851,712 A | 9/1958 | Howard |
| 3,645,992 A | 2/1972 | Elston |

(Continued)

FOREIGN PATENT DOCUMENTS

| CN | 101659133 A | 3/2010 |
| EP | 0978458 A1 | 9/2000 |
| WO | 2008156952 A2 | 12/2008 |

OTHER PUBLICATIONS

International Search Report and Written Opinion pertaining to PCT/US2018/063972, dated Feb. 12, 2019.
(Continued)

*Primary Examiner* — Ellen S Hock
(74) *Attorney, Agent, or Firm* — Dinsmore & Shohl LLP (57) ABSTRACT

Embodiments of the present disclosure are directed to drawtapes for trash bags, wherein the drawtape comprises a multilayer polymer film having an improved stiffness.

9 Claims, 10 Drawing Sheets

(51) Int. Cl.
*B32B 27/32* (2006.01)
*B65D 33/28* (2006.01)
*B65F 1/00* (2006.01)

(52) U.S. Cl.
CPC ........ *B65F 1/002* (2013.01); *B32B 2250/242* (2013.01); *B32B 2250/40* (2013.01); *B32B 2307/30* (2013.01); *B32B 2307/72* (2013.01); *B32B 2435/02* (2013.01); *B65F 2250/1143* (2013.01); *B65F 2250/1146* (2013.01)

(56) References Cited

U.S. PATENT DOCUMENTS

| | | |
|---|---|---|
| 3,914,342 A | 10/1975 | Mitchell |
| 4,076,698 A | 2/1978 | Anderson et al. |
| 5,006,380 A | 4/1991 | Fraser |
| 5,133,607 A | 7/1992 | Bonke |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa |
| 5,854,045 A | 12/1998 | Fang et al. |
| 6,059,458 A | 5/2000 | Belias et al. |
| 6,939,042 B2 | 9/2005 | Rusnak et al. |
| 7,520,673 B2 | 4/2009 | Bonke |
| 8,167,490 B2 | 5/2012 | Hu et al. |
| 9,555,932 B2* | 1/2017 | Tseng .................... B65D 33/28 |
| 9,604,760 B2* | 3/2017 | Kent ...................... B65D 33/28 |
| 2005/0063622 A1 | 3/2005 | Kannabiran |
| 2010/0172602 A1 | 7/2010 | O'Donnell et al. |
| 2011/0002559 A1 | 1/2011 | Wood et al. |
| 2011/0091137 A1 | 4/2011 | Kent |
| 2012/0039549 A1 | 2/2012 | Maxwell et al. |
| 2014/0056544 A1 | 2/2014 | Moras et al. |
| 2014/0254958 A1 | 9/2014 | Cobler |
| 2015/0259104 A1 | 9/2015 | Cobler |

OTHER PUBLICATIONS

Chinese Search Report, pertaining to CN 201880083497.4, dated Mar. 2, 2022.
Chinese Office Action, pertaining to CN 201880083497.4, dated Mar. 2, 2022.

* cited by examiner

COLLAPSED BUBBLE DRAWTAPE FILM FOR IMPROVED ELASTIC AND STIFFNESS PERFORMANCE IN TRASH BAGS

CROSS-REFERENCE TO RELATED APPLICATIONS

This application is a National Stage Entry under 35 U.S.C. § 371 of International Patent Application No. PCT/US2018/063972, filed Dec. 5, 2018, which claims the benefit of U.S. Provisional Patent Application Ser. No. 62/610,670, filed Dec. 27, 2017, both of which are hereby incorporated by reference in their entireties.

TECHNICAL FIELD

Embodiments described herein generally relate to trash bags having drawtapes and specifically relate to trash bags having collapsed drawtapes.

BACKGROUND

There are typically two types of drawtape found in commercial consumer trash bags: standard drawtape and elastic drawtape. Both types of drawtape found in commercial liner bags have drawbacks as a result of inadequate tensile strength. For example, typical standard drawtapes are difficult to open and often fail to grip to the trashcan, which results in the bag collapsing into the receptacle when a heavy weight is placed in the bag. Meanwhile, typical elastic drawtapes may grip to the trashcan and support weight; however, their elasticity causes additional problems that result from an imbalance between tensile strength and elastic recovery. For example, when the trash bags reach a certain weight, most elastic drawtapes elongate extensively and excessively. Therefore, elastic drawtapes also inconvenience consumers as a result of this imbalance.

Accordingly, there is a need for both standard drawtapes with improved tensile strength and elastic drawtapes with improved tensile strength while maintaining a balance with adequate elastic recovery.

SUMMARY

Embodiments of the present disclosure meet those needs by providing a drawtape comprising a multilayer film, which helps improve tensile performance by inducing more machine direction (MD) orientation in the film through a collapsed structure. This increase in the MD orientation allows for improved tensile performance, or stiffness.

Additionally, for embodiments of drawtapes comprising an elastic component, this allows for improved tensile performance with minimal degradation of elastic recovery performance. These results may be accomplished by the addition of higher amounts of elastic material, through the form of linear low density ethylene-based polymers (LLDPEs), which induce more elastic recovery without impacting the stiffness of the material.

According to at least one embodiment of the present disclosure, drawtapes comprising a multilayer film are provided. The multilayer film comprises at least two outer layers and at least two core layers disposed between the two outer layers. Each core layer comprises an ultra low density polyolefin having a density less than 0.905 g/cc, and a melt index ($I_2$) from 0.2 to 5.0 g/10 min, and each outer layer comprises a high density ethylene-based polymer having a density from 0.940 to 0.970 g/cc, and a melt index ($I_2$) from 0.01 to 5.0 g/10 min.

According to another embodiment, the drawtape is a two-ply multilayer film comprising at least 4 layers, wherein the two-ply multilayer film comprises two outer layers and two core layers, and the two core layers adhere to each other.

According to yet another embodiment, the outer layer of the drawtape comprises a skin layer, and a sub-skin layer disposed between the skin layer and the core layer, wherein the sub-skin layer comprises the high density ethylene-based polymer, and the skin layer comprises a linear low density ethylene-based polymer having a density from 0.905 to 0.920 g/cc when measured according to ASTM D792 and a melt index ($I_2$) from 0.2 to 10.0 g/10 min when measured according to ASTM D1238. Further in accordance with this embodiment, the drawtape is a two-ply multilayer film comprising at least 6 layers, where the two-ply multilayer film comprises two skin layers, two core layers, and two sub-skin layers, and the two core layers adhere to each other.

According to another embodiment, a process of manufacturing a collapsed blown film is provided. The process comprises forming a multilayer layer blown film bubble, wherein the multilayer layer blown film bubble comprises an outer layer and a core layer. The core layer comprises an ultra low density polyolefin having a density less than 0.905 g/cc, and a melt index ($I_2$) from 0.2 to 5.0 g/10 min, and the outer layer comprises a high density ethylene-based polymer having a density from 0.940 to 0.970 g/cc, and a melt index ($I_2$) from 0.01 to 5.0 g/10 min. The process further comprises collapsing the multilayer blown film bubble to form a collapsed blown film, where the collapsed blown film comprises a two-ply multilayer film comprising at least 4 layers. Further in accordance with this embodiment, the two-ply multilayer film comprises two outer layers and two core layers, and the two core layers adhere to each other.

These and other embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean a polymer comprising greater than 50% by weight of units derived from ethylene monomer. This includes polyethylene homopolymers or copolymers (meaning units derived from two or more comonomers).

"Polypropylene" or "propylene-based polymer" as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

As used herein, "multilayer drawtape" refers to a structure having multiple layers generally formed via coextrusion. In contrast, "monolayer drawtape" is a single layer film.

Figure 1:
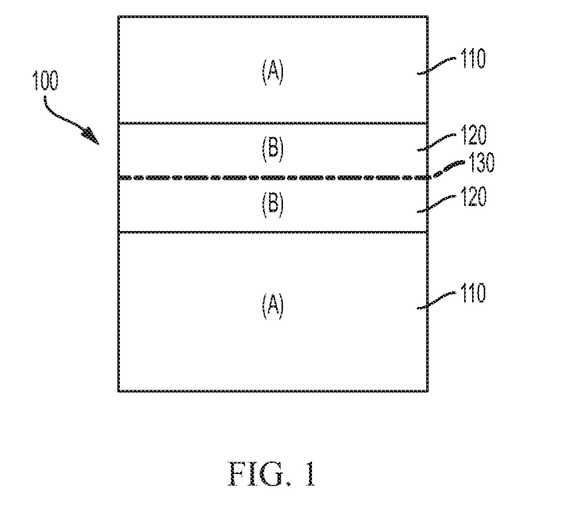
FIG. 1 is a schematic depiction of Inventive Film 1, which is a drawtape with a two-layer collapsed structure.

Reference will now be made in detail to embodiments of various drawtapes comprising multilayer films. Referring to FIG. 1, a multilayer film 100 comprises at least two outer layers 110, and at least two core layers 120 disposed between the two outer layers 110. Each core layer 120 comprises an ultra low density polyolefin having a density less than 0.905 g/cc, and a melt index ($I_2$) from 0.2 to 5.0 g/10 min.

As described below, the ultra low density polyolefin needs to be sufficiently tacky, such that when the blown film bubble is collapsed, the two layers of the ultra low density polyolefin adhere to one another when placed in contact. Various compositions are considered suitable for the ultra low density polyolefin. In one embodiment, the ultra low density polyolefin comprises ultra low density propylene-based polymer. In further embodiments, the ultra low density polyolefin comprises ultra low density ethylene-based polymer. In some embodiments, the ultra low density polyolefin comprises combinations of ultra low density propylene-based polymer and ultra low density ethylene-based polymer. In additional embodiments, the ultra low density polyolefin may include elastomers and plastomers.

Various methodologies are contemplated for producing the ultra low density polyolefins. For example, ultra low density ethylene-based polymer may be produced using Ziegler-Natta catalysts; single-site catalysts including, but not limited to, bis-metallocene catalysts and constrained geometry catalysts; and post-metallocene, molecular catalysts.

While disclosed above that the ultra low density polyolefin has a density less than 0.905 g/cc, the ultra low density polyolefin may have a density less than 0.900 g/cc. In some embodiments, the density of the ultra low density polyolefin is from 0.850 g/cc to 0.905 g/cc, or from 0.880 to 0.900 g/cc. Furthermore, in some embodiments, the melt index ($I_2$) of the ultra low density polyolefin is from the 0.2 to 2.0 g/10 min. In some embodiments, the melt index ($I_2$) of the ultra low density polyolefin is from 0.2 to 1.5 g/10 min.

Referring again to FIG. 1, each outer layer 110 may comprises a high density ethylene-based polymer having a density from 0.940 to 0.970 g/cc, and a melt index ($I_2$) from 0.01 to 5.0 g/10 min. In further embodiments, the density of the high density ethylene-based polymer may be from 0.940 to 0.960 g/cc. In some embodiments, the density of the high density ethylene-based polymer may be from 0.940 to 0.950 g/cc. Moreover, the melt index ($I_2$) of the high density ethylene-based polymer may be from 0.01 to 1.0 g/10 min. In some embodiments, the melt index ($I_2$) of the high density ethylene-based polymer may be from 0.01 to 0.5 g/10 min.

Various methodologies are contemplated for producing the high density ethylene-based polymers. For example, high density ethylene-based polymers are generally prepared using Ziegler-Natta catalysts, chrome catalysts or single-site catalysts including, but not limited to, bis-metallocene catalysts and constrained geometry catalysts.

It is also contemplated that the multilayer film includes less than 35% by weight high density ethylene-based polymer. In some embodiments, the multilayer film includes less than 30% by weight high density ethylene-based polymer. Furthermore, in some embodiments, the multilayer film includes less than 25% by weight high density ethylene-based polymer. Without being limited by theory, using less than 35% high density ethylene-based polymer yields improvement in elongation (%) as will be further illustrated below.

Referring yet again to FIG. 1, the multilayer film 100 is a two-ply multilayer film that comprises two outer layers 110 and two core layers 120. The two core layers 200 adhere to each other 130.

Figure 2:
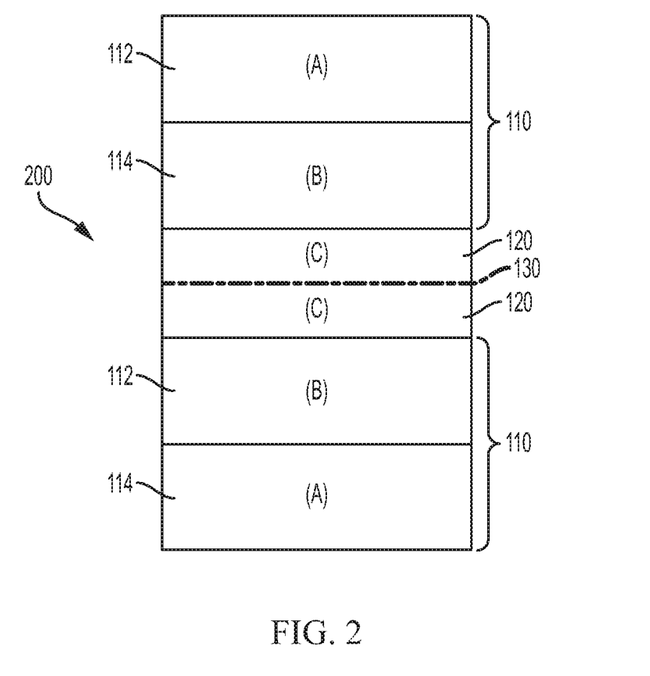
FIG. 2 is a schematic depiction of Inventive Film 2, which is a drawtape with a three-layer collapsed structure.

Referring to FIG. 2, other embodiments are directed to a two-ply multilayer film 200 comprising at least 6 layers. Like the multilayer film of FIG. 1, the two core layers 120 are adhered to each other 130. In this embodiment, each outer layer 110 comprises a skin layer 112 and a sub-skin layer 114 disposed between the skin layer 112 and the core layer 120. In accordance with this embodiment, the sub-skin layer 114 comprises the high density ethylene-based polymer referenced above.

In one or more embodiments, the skin layer 112 comprises a linear low density ethylene-based polymer having a density from 0.905 to 0.920 g/cc when measured according to ASTM D792, and a melt index ($I_2$) from 0.2 to 10.0 g/10 min when measured according to ASTM D1238. In another embodiment, the density of the linear low density ethylene-based polymer is from 0.910 to 0.920 g/cc, or from 0.915 g/cc to 0.920 g/cc. It is also contemplated that the melt index ($I_2$) of the linear low density ethylene-based polymer may be from 0.2 to 2.0 g/10 min, or from 0.2 to 1.5 g/10 min.

Various methodologies are contemplated for producing linear low density ethylene-based polymers. For example, linear low density ethylene-based polymer resins may be made using Ziegler-Natta catalyst systems, resin made using single-site catalysts including, but not limited to, bis-metallocene catalysts and constrained geometry catalysts, and resin made using post-metallocene molecular catalysts. Linear low density ethylene-based polymer resins may include linear, substantially linear or heterogeneous ethylene-based polymer copolymers or homopolymers. Linear low density ethylene-based polymer resins may contain less long chain branching than LDPEs and include substantially linear ethylene-based polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). Linear low density ethylene-based polymer resins may be made via gas-phase, solution-phase or slurry polymerization or any combination thereof, using any type of reactor or reactor configuration known in the art.

In one or more embodiments, the multilayer film comprises greater than 65% by weight linear low density ethylene-based polymer. In some embodiments, the multilayer film includes greater than 70% by weight linear low density ethylene-based polymer. Furthermore, in some embodiments, the multilayer film includes less than 80% by weight high density ethylene-based polymer.

Figure 3:
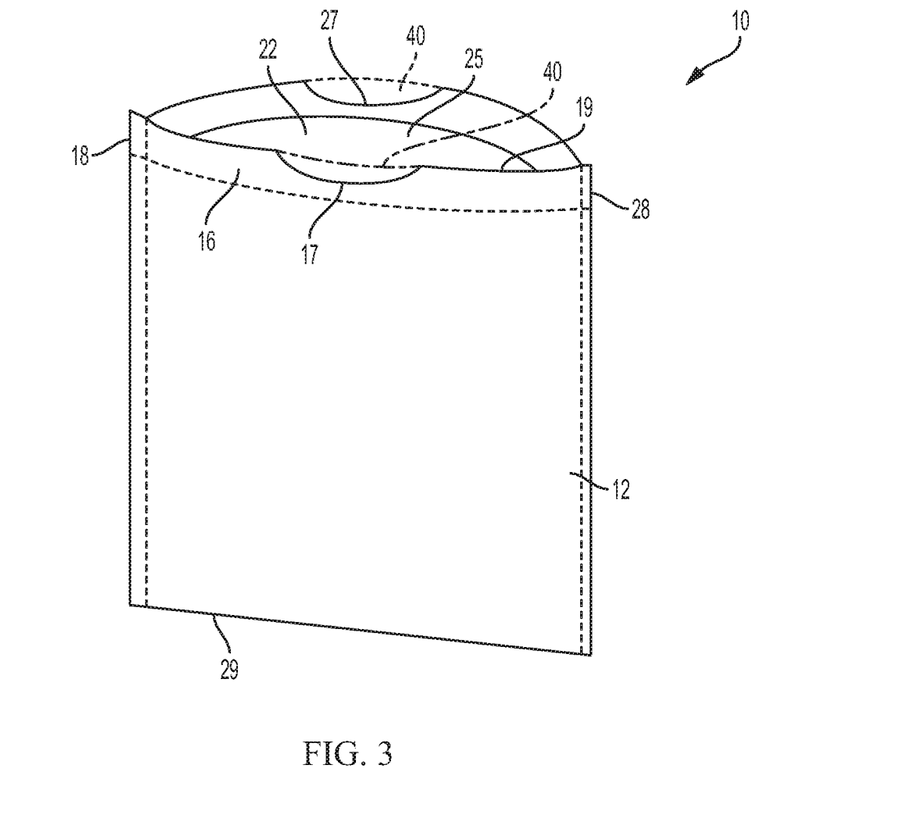
FIG. 3 is a schematic depiction of a trash bag in accordance with one or more embodiments of the present disclosure.

Reference will now be made in detail to various thermoplastic bag embodiments of the present disclosure. Referring to FIG. 3, the thermoplastic bag 10 comprises a first panel 12 and a second panel 22. The first panel 12 and the second panel 22 are joined together at a first side edge 18, a second side edge 28, and a bottom edge 29. The first panel 12 and the second panel 22 define an opening 25 along respective top edge 19 of the first panel 12 and the second panel 22. Moreover, the first panel 12 and the second panel 22 define a closed end due to the first panel 12 and the second panel 22 being joined along the bottom edge 29.

Referring again to FIG. 1, the thermoplastic bag 10 comprises a hem 16 formed along the top edge 19. As shown, the hem 16 is a thermoplastic flap extending from the top edge 19 of the first panel 12 and the second panel 22 and sealed to the first panel 12 and the second panel 22, such that a channel is formed between the first hem 16 and the first panel 12 and the second panel 22.

The thermoplastic bag 10 comprises a drawtape 40 disposed within the channel, the drawtape comprising the multilayer films described above, for example, multilayer film 100 or multilayer film 200. Moreover, the first panel 12 has a first drawtape access hole 17 located along the top edge 19 of the first panel 12. The first drawtape access hole 17 permits exterior access to the drawtape 40. The second panel 22 has a second drawtape access hole 27 located along the top edge 23 of the second panel 22. The second drawtape access hole 27 permits exterior access to the drawtape 40.

Various methods of producing the thermoplastic bag would be familiar to one of ordinary skill in the art. For example, the first panel 12, the second panel 22, and drawtape 40 may undergo surface modification, such as, ring rolling, machine direction orientation (MDO) stretching, or embossing.

Reference will now be made in detail to various embodiments of the present disclosure for a process of manufacturing these multilayer films. In one or more embodiments, the process comprises forming a multilayer layer blown film bubble and collapsing the multilayer blown film bubble to form a collapsed blown film. The collapsed blown film comprises a two-ply multilayer film comprising the 4-layer structure of FIG. 1 or the 6-layer structure of FIG. 2.

For the 4-layer two-ply multilayer film of FIG. 1, the process of manufacturing a collapsed blown film comprises forming a multilayer layer blown film bubble, wherein the multilayer layer blown film bubble comprises an outer layer 110, and a core layer 120. Next, the process involves collapsing the multilayer blown film bubble to form a collapsed blown film, wherein the collapsed blown film comprises a two-ply multilayer film comprising at least 4 layers Further in accordance with this embodiment, the two-ply multilayer film comprises two outer layers and a two-ply core layers, and the two core layers adhere to each other. The process for the two-ply film of FIG. 2 is similar to the process for the two-ply film of FIG. 1 with the exception that a 3-layer film is being collapsed to produce the 6 layer film.

More details regarding the collapsing technique in blown film processes are described as follows. During the blown film process, an extruded plastic film from an extruder die is formed and pulled up a tower onto a nip. At the nip, the bubble is collapsed into a two-ply flat sheet. In contrast, in a conventional blown film process, before the film is wound onto a core, the sides of the two-ply film are trimmed off to separate the film into two individual single-ply films. In a collapsed blown film process, such as process embodiments of the present disclosure, the films are not separated—meaning that the two-ply film remains collapsed. Therefore, the blown film needs to be one-half of the thickness of the finished article because the two-ply technique will give the desired gauge. The stickiness of the ultra low density polyolefin on an inner side of the bubble ensures adhesion once the bubble is collapsed. This makes the two-ply film difficult to separate, which is important for these applications. Without being bound by theory, this collapsing process used for producing two-ply film imparts an improved tensile strength. Moreover, for embodiments that also comprise an elastic component, this collapsing process used for producing two-ply film imparts an improved balance of tensile strength, or stiffness, and elastic recovery, which is highly desirable in drawtape application.

In further embodiments, the blown film bubble is formed via a blown film extrusion line having a blow up ratio of from 1 to 4, or from 1 to 3. Moreover, the forming of the multilayer layer blown film bubble step may occur at a temperature of from 350 to 500° F., or from 375 to 475° F. The output speed may be from 10 to 50 lb/hr/in, or from 10 to 30 lb/hr/in.

Test Methods

The test methods include the following:

Melt Index ($I_2$)

To test the melt index ($I_2$), ethylene-based polymer samples are measured according to ASTM D1238 at 190° C. at 2.16 kg. The values are reported in g/10 min, which corresponds to grams eluted per 10 minutes. Propylene-based polymers are measured according to ASTM D1238 at 230° C. at 2.16 kg Density To test the density, samples are prepared and measured according to ASTM D4703 and reported in grams/cubic centimeter (g/cc or g/cm$^3$). Measurements are made within one hour of sample pressing using ASTM D792, Method B.

Rigidity and Stiffness

To test the rigidity and stiffness of a film, a standard tensile test is performed according to ASTM D882, and the load is calculated as a function of strain. For good load carrying capability, a drawtape requires high yield and break stresses. Tensile properties in both the machine direction (MD) and cross direction (CD) are determined according to ASTM D882 at a crosshead speed of 20 inches per minute (in/min). The width of the sample is 1 inch and the width of the initial grip separation is 5 inches. The sample is continuously pulled in the MD on an Instron instrument at a speed of 20 in/min until it breaks. The break stress is recorded as tensile strength.

Elastic Recovery

To test the elastic recovery of a drawtape, a modified Stretch Hooder 60/40 experiment (ASTM D4649) is performed, and the elastic recovery is calculated using the data gathered. The modified Stretch Hooder 60/40 experiment includes changing the percent strain from 60/40 to 12/6 and the holding time from 15 seconds to 2 seconds, respectively. When performing the experiment, first, 1 inch sample strips are pulled in the machine direction on an Instron with a 5 inch grip separation. Second, the sample is stretched to 12% strain at a speed of 20 in/min and is held for 2 seconds. The crosshead then returns to 6% strain and holds for 100 seconds. Third, the train returns back to 0%. Elastic recovery of the film is then calculated using the data gathered from this experiment.

Free Shrinkage

To test the unrestrained biaxial heat shrinkage of a film, a hot oil bath test is used. The hot oil bath comprised silicon oil and was maintained at a temperature of 140° C. Free shrinkage measures the amount of polymer orientation in the amorphous region of the semi-crystalline polymer. The results of the hot oil bath test are reported, and the change in machine direction (MD) and cross direction (CD) dimensions of a precut sample are compared.

EXAMPLES

The following examples illustrate features of the present disclosure but are not intended to limit the scope of the disclosure. The following experiments compared the performance of multilayer collapsed drawtapes with drawtapes produced via separation.

Materials

For these experiments, the following resins utilized in the multilayer experimental films and their material properties are provided in Table 1 below.

TABLE 1

Resins

| Resin | $I_2$ (g/10 min) | Density (g/cc) | Supplier |
| --- | --- | --- | --- |
| AFFINITY ™ PF 1140G (Ultra low density ethylene based polymer) | 1.6 | 0.8965 | The Dow Chemical Company (Midland, MI) |
| ELITE ™ AT 6410 (linear low density ethylene based polymer) | 0.85 | 0.912 | The Dow Chemical Company (Midland, MI) |
| DOW ™ DGDC-2100 NT 7 (high density ethylene based polymer) | 0.07 | 0.948 | The Dow Chemical Company (Midland, MI) |

Fabrication Conditions

All films were fabricated using a Lab Tech 5-Layer Lab-Scale Blown Film process. The line was equipped with a 3 inch die with an estimated specific output of 3 to 6 lbs/hr/in of die circumference based on bubble stability. The processing conditions are summarized in Table 2 below.

TABLE 2

Fabrication Conditions

| Blow-Up Ratio | 1:2 |
| --- | --- |
| Gauge (mil) | 3.0 |
| Gauge Variation (%) | 8.7 |
| Melt Temperature (° F.) | 410-480 |

To establish that the collapsed films exhibit improved results over traditional fabrication techniques, comparative films were made using the same resin at the same gauge without collapsing the films.

TABLE 3

Drawtape Compositions

Figure 4:
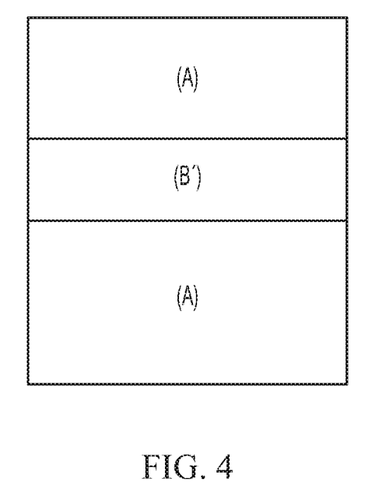
FIG. 4 is a schematic depiction of Comparative Film 1, which is a drawtape with a two-layer separated structure.
Figure 5:
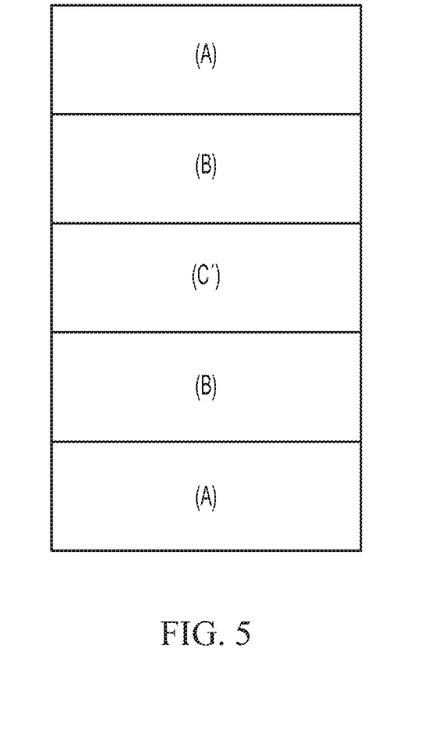
FIG. 5 is a schematic depiction of Comparative Film 2, which is a drawtape with a three-layer separated structure.

| Film | Layers |
| --- | --- |
| Comparative Film 1 2-layer, separated film A/B'/A (depicted in FIG. 4) | 40% by thickness A: DGDC-2100 NT 7; 20% B: AFFINITY ™ PF 1140G; 40% A: DGDC-2100 NT 7; |
| Inventive Film 1 2-layer, collapsed film A/B + B/A (depicted in FIG. 1) | 40% A: DGDC-2100 NT 7; 10% B: AFFINITY ™ PF 1140G 10% B: AFFINITY ™ PF 1140G 40% A: DGDC-2100 NT 7; |
| Comparative Film 2 3-layer, separated film A/B/C'/B/A (depicted in FIG. 5) | 10% A: ELITE ™ AT 6410 30% B: DGDC-2100 NT 7 20% C: AFFINITY ™ PF 1140G 30% B: DGDC-2100 NT 7 10% A: ELITE ™ AT 6410 |
| Inventive Film 2 3-layer, collapsed film A/B/C + C/B/A (depicted in FIG. 2) | 10% A: ELITE ™ AT 6410; 30% B: DGDC-2100 NT 7 10% C: AFFINITY ™ PF 1140G 10% C: AFFINITY ™ PF 1140G 30% B: DGDC-2100 NT 7 10% A: ELITE ™ AT 6410 |

Experimental Results

To identify the effect on stiffness when the bubble is collapsed, the above four samples with final thickness of 3 mils were made on a blown film line. Each Comparative Film was slit and separated into two separate films, which are wound on individual rolls, and each Inventive Film was collapsed in a tube and collected on one roll.

A comparison of the MD shrinkage between the collapsed and separated films is summarized in Table 4 below.

TABLE 4

MD Shrinkage of Collapsed v. Separated Films

| Film | MD Shrinkage (%) |
| --- | --- |
| Comparative Film 1 | 66.1 |
| Inventive Film 1 | 73.4 |
| Comparative Film 2 | 65.6 |
| Inventive Film 2 | 72.5 |

The free shrink data in Table 4 shows that the collapsed bubble films have higher shrinkage compared to the separated films. For collapsed bubble processes, the tensile performance was higher compared to a single-ply, separated film at the same thickness. The collapsed bubble technique provides higher tensile performance because the MD orientation of polymer chains increases as the extruded film becomes thinner. Therefore, in a collapsed bubble format, the polymer chains in the final product have higher orientation allowing for improved tensile performance.

For the films with an elastic component, such as Inventive Film 2, another important aspect is that higher MD orientation does not deteriorate the elastic recovery, which is important for functionality in various applications. Therefore, a collapsed bubble film has better tensile-to-elastic recovery balance compared to a separated film.

Figure 6:
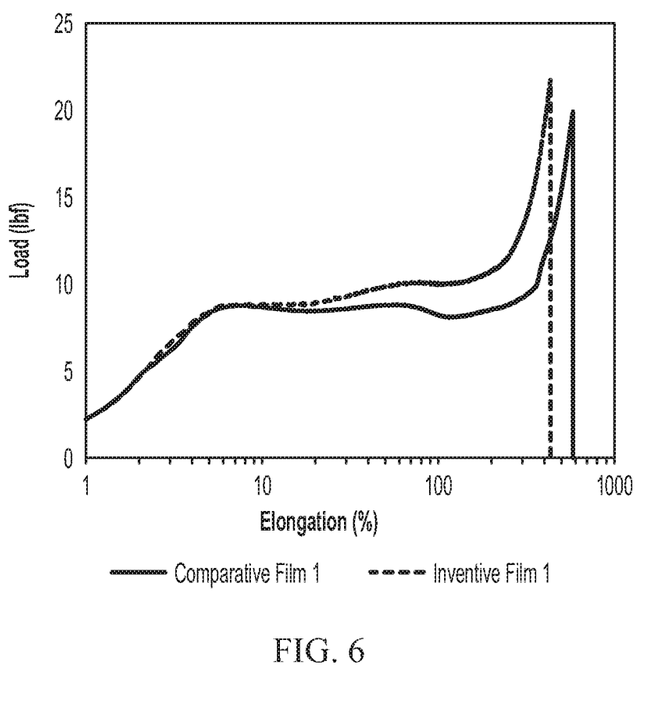
FIG. 6 is a graphical depiction comparing the tensile curves for Comparative Film 1 and Inventive Film 1.
Figure 7:
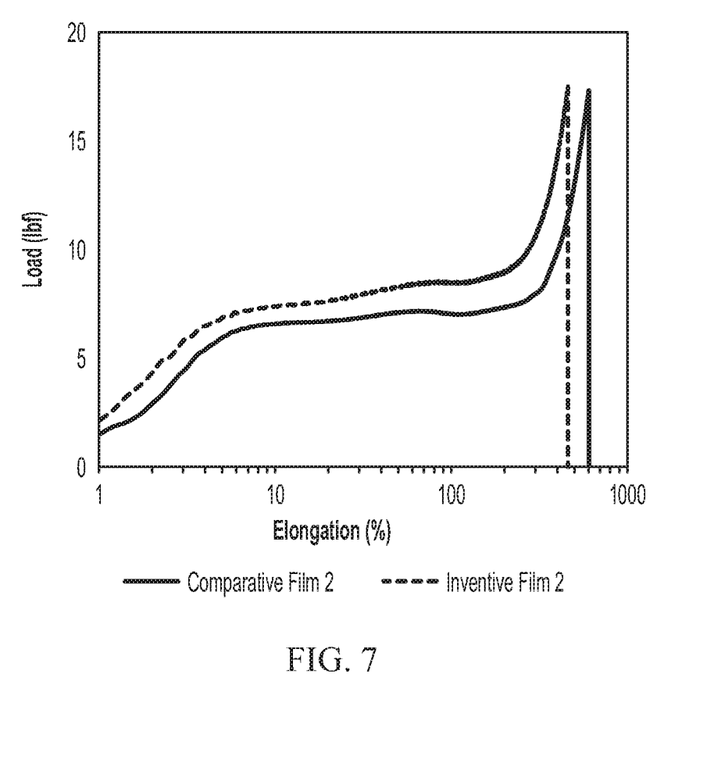
FIG. 7 is a graphical depiction comparing the tensile curves for Comparative Film 2 and Inventive Film 2.

Referring now to FIG. 6, which compares Inventive Film 1 and Comparative Film 1, and FIG. 7, which compares Inventive Film 2 and Comparative Film 2, the tensile curves showed the effect of collapsing the bubble compared to separated film on tensile strength. In FIG. 6, the tensile curve for Inventive Film 1 shifted to the left when the bubble is collapsed, which leads to higher load values versus elongation. Similarly, in FIG. 7, the tensile curve for Inventive Film 2 also shifted to the left when the bubble is collapsed, which also leads to the same effect. The break stress is the same for both values, which is essential, as break stress is an important parameter for drawtape. This shift is due to the increase in orientation in the film when collapsing the bubble. To keep the same final thickness when collapsing a bubble, the film thickness needs to be reduced by half on the blown film line. Decreasing the film thickness by 50% means that the draw down ratio is doubled. Draw down ratio is a representation of film orientation and is inversely proportional to the thickness of the film.

Figure 8:
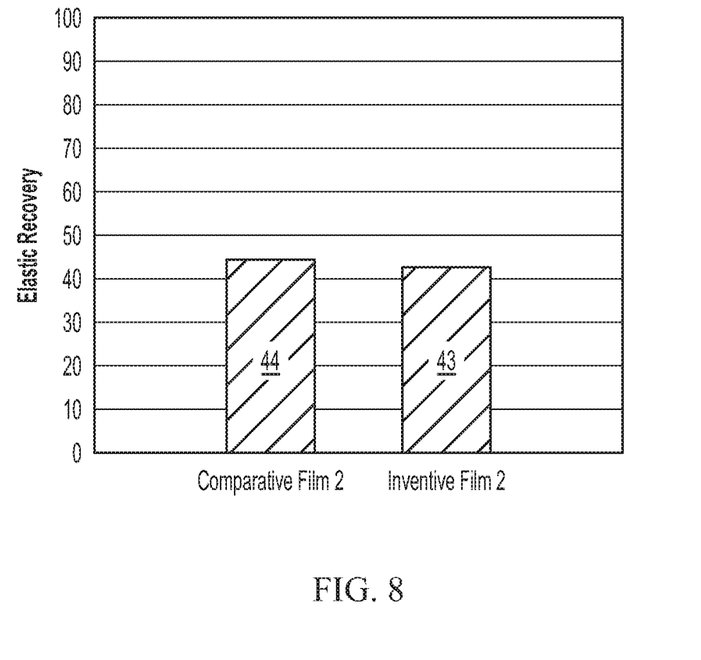
FIG. 8 is a graphical depiction comparing the elastic recovery curves for Comparative Film 2 and Inventive Film 2.

Referring now to FIG. 8, which compares Inventive Film 2 and Comparative Film 2, it was determined that maintaining elastic recovery is significant. Although Inventive Film 2 exhibited improved tensile strength (as explained in FIG. 7 above), the elastic recovery remained comparable to that of the Comparative Film 2. This allows for a greater balance between elastic recovery and tensile performance—a balance that is hard to achieve.

A range of percent high density ethylene-based polymer (DGDC-2100) was also tested to identify the optimum film structure of Inventive Film 2 for the drawtape. The percentage of overall layer thickness of DGDC-2100 is summarized in Table 5 below.

TABLE 5

Percentage of High density ethylene-based polymer (DGDC-2100)

| Layer | 60% DGDC-2100 | 40% DGDC-2100 | 34% DGDC-2100 | 30% DGDC-2100 | 20% DGDC-2100 |
|---|---|---|---|---|---|
| ELITE ™ AT 6410 (2 layers) | 20% | 40% | 46% | 50% | 60% |
| DGDC-2100 NT 7 (2 layers) | 60% | 40% | 34% | 30% | 20% |
| AFFINITY ™ PF 1140G (2 layers) | 20% | 20% | 20% | 20% | 20% |

Figure 9:
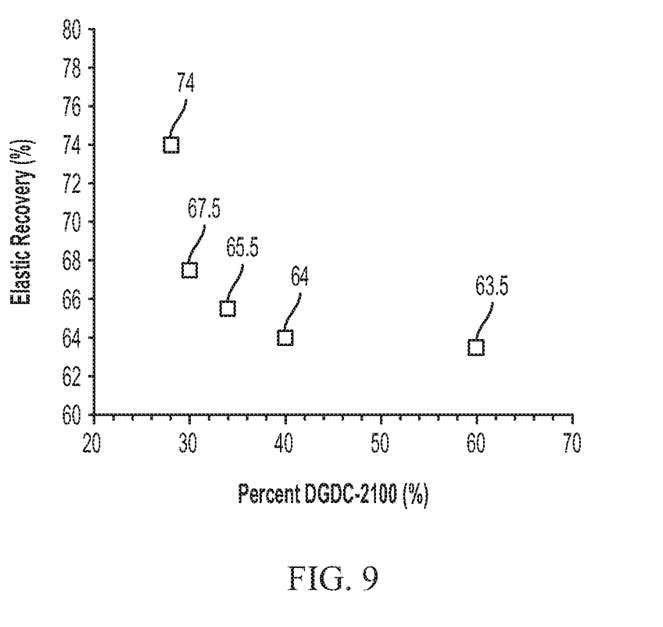
FIG. 9 is a graphical depiction demonstrating the effect of HDPE resin on the elastic recovery for a collapsed bubble film.

Referring now to FIG. 9, the influence of the high density ethylene-based polymer resin on the elastic recovery for a collapsed bubble film is shown. As expected, when the fraction of high density ethylene-based polymer (DGDC-2100) increases in the film's structure, the elastic recovery decreases. This is because when there is less than 45% elastic component (ELITETMAT 6410) in the overall structure, there is not enough elasticity to balance with stiffness. Therefore, to meet the elastic recovery requirement while also achieving the necessary balance with tensile performance, 35% or less DGDC-2100 is needed in the overall film structure.

Figure 10:
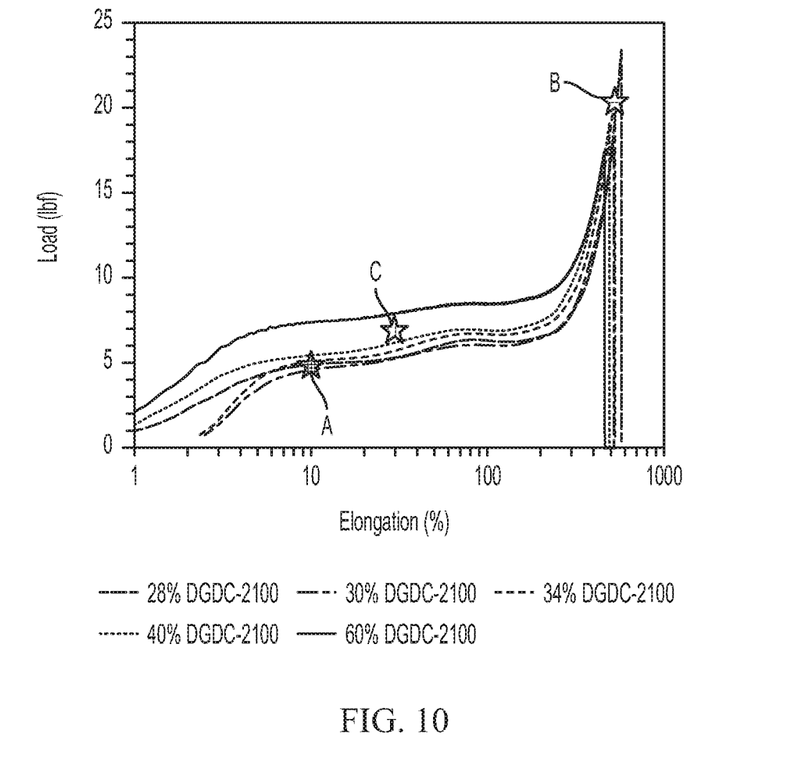
FIG. 10 is a graphical depiction demonstrating the effect of HDPE on the tensile performance of the collapsed film.

Referring now to FIG. 10, the influence of the high density ethylene-based polymer resin on the tensile performance of the collapsed film is shown. Reducing the amount of DGDC-2100 in the coextruded structure of Inventive Film 2 reduces the stiffness of the film. However, having 60% DGDC-2100 in the film structure can give sufficient stiffness to meet the load carrying requirement.

In the lower ranges of DGDC-2100, the tensile performance meets the easy open and high break load criteria, illustrated using the stars labeled A and B in FIG. 10, respectively. From a yield load perspective, illustrated using the star labeled C, the film structures are slightly below the wanted value, which would lead to higher elongations when carrying the load.

In conclusion, embodiments of the present disclosure show the differentiation of collapsed drawtape over conventional drawtape solutions. The higher orientation in the films provides improved load carrying capability while not deteriorating the elastic recovery. These films balance both aspects to improve the physical properties and meeting necessary requirements for drawtape.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A drawtape comprising multilayer film, wherein the multilayer film comprises:
at least two outer layers, and at least two core layers disposed between the two outer layers, wherein:
each core layer comprises an ultra low density polyolefin having a density less than 0.905 g/cc when measured according to ASTM D792, and a melt index ($I_2$) from 0.2 to 5.0 g/10 min when measured according to ASTM D1238; and
each outer layer comprises a skin layer, and a sub-skin layer disposed between the skin layer and the core layer, wherein the sub-skin layer comprises a high density ethylene-based polymer having a density from 0.940 to 0.970 g/cc when measured according to ASTM D792, and a melt index ($I_2$) from 0.01 to 5.0 g/10 min when measured according to ASTM D1238, and the skin layer comprises a linear low density ethylene-based polymer having a density from 0.905 to 0.920 g/cc when measured according to ASTM D792, and a melt index ($I_2$) from 0.2 to 10.0 g/10 min when measured according to ASTM D1238.

2. The drawtape of claim 1, wherein the drawtape is a two-ply multilayer film comprising at least 6 layers, the two-ply multilayer film comprising two skin layers, two core layers, and two sub-skin layers, the two core layers being adhered to each other.

3. The drawtape of claim 2, wherein the two-ply multilayer film comprising at least 6 layers comprises less than 35% high density ethylene-based polymer.

4. The drawtape of claim 1, wherein the multilayer film includes less than 35% by weight high density ethylene-based polymer.

5. The drawtape of claim 1, wherein the multilayer film comprises greater than 65% by weight linear low density ethylene-based polymer.

6. The drawtape of claim 1, wherein the density of the linear low density ethylene-based polymer is from 0.910 to 0.920 g/cc and the melt index ($I_2$) is from 0.2 to 2.0 g/10 min.

7. The drawtape of claim 1, wherein the density of the ultra low density polyolefin is less than 0.900 g/cc.

8. The drawtape of claim 1, wherein the melt index of the high density ethylene-based polymer is from the 0.01 to 1.0 g/10 min.

9. The drawtape of claim 1, wherein the ultra low density polyolefin comprises ultra low density propylene-based polymer, ultra low density ethylene-based polymer, or combinations thereof.

* * * * *